United States Patent
Shim et al.

(10) Patent No.: US 11,559,918 B2
(45) Date of Patent: Jan. 24, 2023

(54) ADDITIVELY MANUFACTURED COMPOSITE COMPONENTS

(71) Applicants: Rolls-Royce Corporation, Indianapolis, IN (US); Rolls-Royce High Temperature Composites, Inc., Cypress, CA (US)

(72) Inventors: Sungbo Shim, Irvine, CA (US); Cory Nation, Indianapolis, IN (US); Michael G. Abbott, Anaheim, CA (US)

(73) Assignees: Rolls-Royce Corporation, Indianapolis, IN (US); Rolls-Royce High Temperature Composites, Inc., Cypress, CA (US)

( * ) Notice: Subject to any disclaimer, the term of this patent is extended or adjusted under 35 U.S.C. 154(b) by 394 days.

(21) Appl. No.: 16/156,630

(22) Filed: Oct. 10, 2018

(65) Prior Publication Data
US 2020/0114539 A1   Apr. 16, 2020

(51) Int. Cl.
*B28B 1/00* (2006.01)
*B33Y 10/00* (2015.01)
(Continued)

(52) U.S. Cl.
CPC .......... *B28B 1/001* (2013.01); *B28B 17/0081* (2013.01); *B33Y 10/00* (2014.12); *B33Y 30/00* (2014.12); *B33Y 50/02* (2014.12)

(58) Field of Classification Search
CPC ......... B33Y 10/00; B33Y 50/02; B33Y 30/00; B33Y 70/10; B33Y 40/20; B28B 1/001; B28B 17/0081; C04B 35/00; B29C 64/118
See application file for complete search history.

(56) References Cited

U.S. PATENT DOCUMENTS 5,459,114 A * 10/1995 Kaya ..................... C04B 35/589
106/287.11
6,164,850 A * 12/2000 Speakman ............ B29C 64/112
400/120.09
(Continued)

OTHER PUBLICATIONS

Beitia et al., "Quartz Pendulous Accelerometers for Navigation and Tactical Grade Systems," 2015 DGON Inertial Sensors and Systems Symposium (ISS), Sep. 22-23, 2015, 20 pp.
(Continued)

*Primary Examiner* — Jacob T Minskey
*Assistant Examiner* — Caroline Beha
(74) *Attorney, Agent, or Firm* — Shumaker & Sieffert, P.A.

(57) ABSTRACT

An example technique includes extruding, by a tow deposition device, on a tow-by-tow basis, respective impregnated tows of a plurality of respective impregnated tows to form a layer of material on a major surface of a substrate. Each respective impregnated tow includes at least one ceramic fiber and a curable resin coating the at least one ceramic fiber. The example technique includes curing the curable resin to form a cured composite component. An example system includes a tow deposition device, an energy source, and a computing device. The computing device is configured to control the tow deposition device to extrude, on a tow-by-tow basis, respective impregnated tows of a plurality of respective impregnated tows to form a layer of material, and is configured to control the energy source to cure the curable resin to form a cured composite component.

15 Claims, 3 Drawing Sheets

(51) Int. Cl.
   *B33Y 50/02*   (2015.01)
   *B33Y 30/00*   (2015.01)
   *B28B 17/00*   (2006.01)

(56) References Cited

U.S. PATENT DOCUMENTS

| | | | | |
|---|---|---|---|---|
| 6,500,365 | B1* | 12/2002 | Cecchi | B29C 48/156 425/114 |
| 9,579,851 | B2 | 2/2017 | Mark et al. | |
| 9,796,140 | B2 | 10/2017 | Page | |
| 9,926,796 | B2 | 3/2018 | Kittleson | |
| 2003/0008067 | A1* | 1/2003 | Yamaguchi | F02K 9/62 427/249.15 |
| 2003/0044593 | A1* | 3/2003 | Vaidyanathan | C04B 35/62863 428/297.4 |
| 2003/0082485 | A1* | 5/2003 | Bulthaup | B82Y 10/00 430/312 |
| 2003/0236588 | A1* | 12/2003 | Jang | C04B 35/62873 700/119 |
| 2015/0102526 | A1 | 4/2015 | Ward et al. | |
| 2015/0266235 | A1* | 9/2015 | Page | B29C 64/393 264/245 |
| 2016/0214907 | A1* | 7/2016 | Shim | C04B 41/52 |
| 2016/0305048 | A1* | 10/2016 | Magdefrau | C04B 35/62868 |
| 2016/0347667 | A1 | 12/2016 | Nordahl | |
| 2017/0320232 | A1 | 11/2017 | de Diego | |
| 2017/0368769 | A1 | 12/2017 | Baumbach | |
| 2018/0038045 | A1 | 2/2018 | Oberste et al. | |
| 2018/0126667 | A1 | 5/2018 | Wilenski et al. | |
| 2018/0214914 | A1* | 8/2018 | Meyer | B08B 5/00 |
| 2021/0213649 | A1* | 7/2021 | Ochi | B29C 70/30 |

OTHER PUBLICATIONS

Clarke, "3D Woven Textiles for Composite Applications," T.E.A. M., Inc., Presented at UMAMI, Mar. 20, 2018, 23 pp.
"3D Woven Preforms," T.E.A.M., Inc., Retrieved from (https://web.archive.org/web/20170717040049/http://www.teamtextiles.com/3d-woven-preforms) Jul. 17, 2017, 3 pgs.
Murthy et al., "Modeling of 3-D Woven Ceramic Matrix Composites," NASA, Jan. 2003, 14 pp.
Petersen et al., "3D-Woven Fiber-Reinforced Composites for CAD/CAM Dental Application," Sampe J., May 2016, 19 pp.
Mazars et al, "Damage Investigation and Modeling of 3D Woven Ceramic Matrix Composites from X-Ray Tomography In-Situ Tensile Tests," Acta Materiala, Elsevier, Jun. 8, 2017, 25 pp.

* cited by examiner

ADDITIVELY MANUFACTURED COMPOSITE COMPONENTS

TECHNICAL FIELD

The disclosure relates to additive manufacturing techniques, in particular, to additive manufacturing of composite components.

BACKGROUND

Additive manufacturing generates three-dimensional structures through addition of material layer-by-layer or volume-by-volume to form the structure, rather than removing material from an existing volume to generate the three-dimensional structure. Additive manufacturing may be advantageous in many situations, such as rapid prototyping, forming components with complex three-dimensional structures, or the like. In some examples, additive manufacturing may include fused deposition modeling, in which heated material, such as polymer, is extruded from a nozzle and cools to be added to the structure, or stereolithography, in which an energy source is used to selectively cure a liquid photopolymer resin to a desired shape of the component.

SUMMARY

The disclosure describes example techniques, systems, materials, and compositions for additively manufacturing composite components, such as ceramic matrix composite (CMC) components.

In some examples, the disclosure describes a technique including extruding, by a tow deposition device, on a tow-by-tow basis, respective impregnated tows of a plurality of respective impregnated tows to form a layer of material on a major surface of a substrate. Each respective impregnated tow includes at least one ceramic fiber and a curable resin coating the at least one ceramic fiber. The technique includes curing the curable resin to form a cured composite component.

In some examples, the disclosure describes a technique including extruding, by a tow deposition device, on a tow-by-tow basis, respective impregnated tows of a plurality of respective impregnated tows to form a layer of material on a major surface of a substrate. Each respective impregnated tow includes at least one ceramic fiber and a curable resin coating the at least one ceramic fiber. The technique includes laying up a plurality of layers of the material to form a laid-up component. The technique includes curing the curable resin to form a cured composite component.

In some examples, the disclosure describes a system including a tow deposition device, an energy source, and a computing device. The computing device is configured to control, based on a model of a composite component, the tow deposition device to extrude, on a tow-by-tow basis, respective impregnated tows of a plurality of respective impregnated tows to form a layer of material on a major surface of a substrate. Each respective impregnated tow includes at least one ceramic fiber and a curable resin coating the at least one ceramic fiber. The computing device is configured to control the energy source to cure the curable resin to form a cured composite component.

The details of one or more examples are set forth in the accompanying drawings and the description below. Other features, objects, and advantages will be apparent from the description and drawings, and from the claims.

DETAILED DESCRIPTION

The disclosure generally describes systems and techniques for forming additively manufactured composite components, such as, for example, ceramic matrix composite (CMC) components. The systems and techniques extrude ceramic tows impregnated with a curable resin at selected locations to build up a layer material including resin-impregnated tows. The resin may be at least partially cured to join the tows within the layer of material. In some examples, the resin may be at least partially cured after laying up a single layer of material. In other examples, the resin may be at least partially cured after laying up multiple layers of material, each layer of material including resin-impregnated tows. Such additive manufacturing of composite materials may reduce the time and number of processing steps, may reduce defects introduced during manufacture, or both. In some examples, relatively complex CMC components can be prepared using fewer steps, higher accuracy, and lower defects, compared to conventional techniques for forming CMC components, which include preparing pre-impregnated plies by interface coating ceramic tow, impregnating the tows with a wet matrix slurry, and drum winding to prepare plies. The pre-impregnated plies are cut into specific sizes and shapes, and then stacked and consolidated.

Figure 1A:
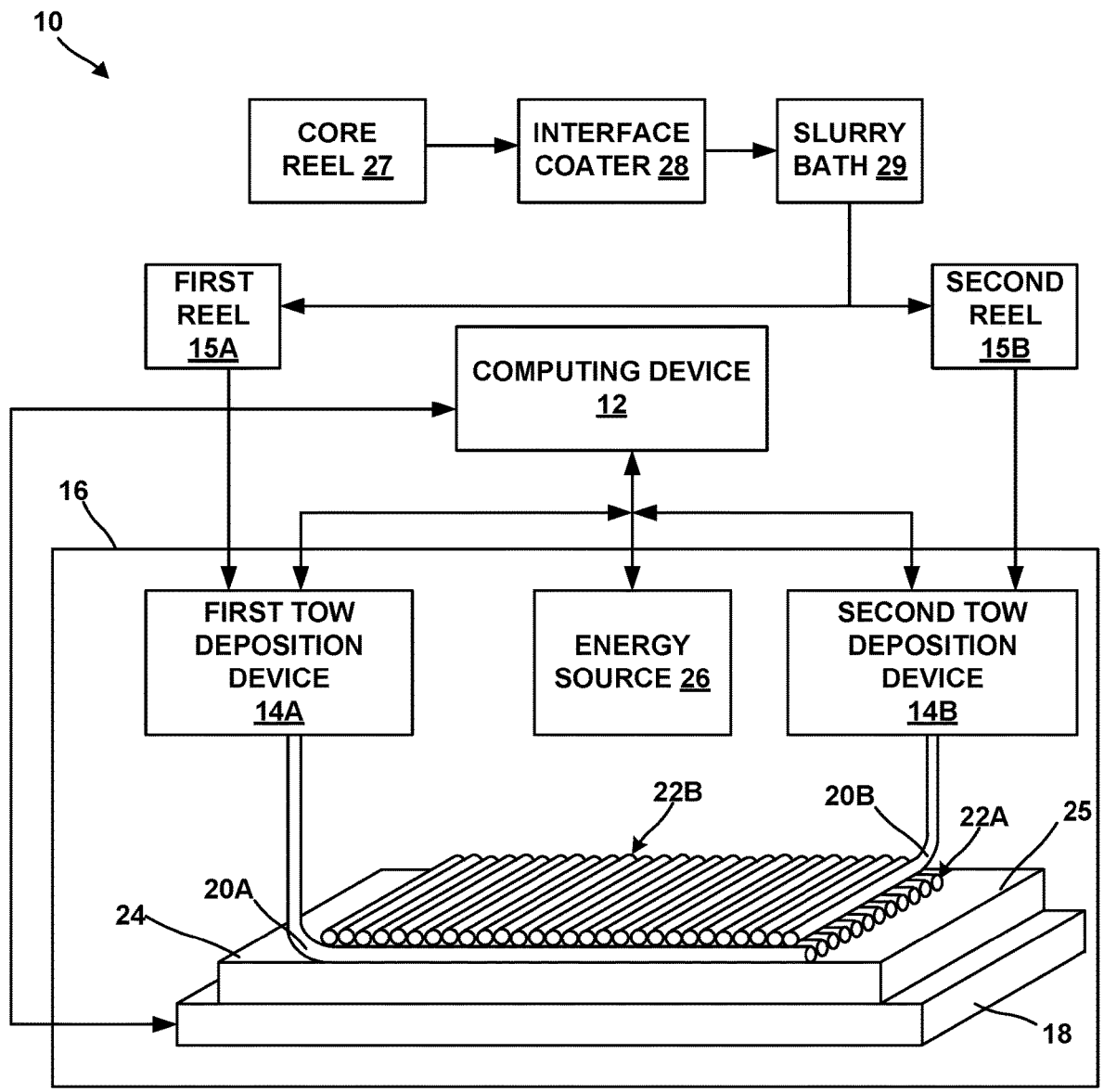
FIG. 1A is a conceptual block diagram illustrating an example system for forming an additively manufactured composite component by laying up impregnated tows on a tow-by-tow basis.

FIG. 1A is a conceptual block diagram illustrating an example additive manufacturing system 10 for forming an additively manufactured composite component, which may be a ceramic matrix composite (CMC) component or a precursor to a CMC component, by laying up resin-impregnated tows on a tow-by-tow basis. Additive manufacturing system 10 includes at least one deposition system for depositing a coated or impregnated filament, fiber, or tow. A fiber includes multiple assembled filaments (e.g., wound or braided together). A tow includes multiple assembled fibers (e.g., wound or braided together).

Additive manufacturing system 10 may include a computing device 12, a tow deposition device (for example, a first tow deposition device 14A), an enclosure 16, and a stage 18.

Computing device 12 may include, for example, a desktop computer, a laptop computer, a workstation, a server, a mainframe, a cloud computing system, or the like. Computing device 12 is configured to control operation of additive manufacturing system 10, including, for example, tow deposition device 14A, stage 18, or both. Computing device 12 may be communicatively coupled to tow deposition device 14A, stage 18, or both using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like. In come examples, computing device 12 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Tow deposition device 14A includes an opening, for example, a nozzle, through which an impregnated or coated fiber, filament, or tow passes, for example, extruded. System 10 may include a reel, for example, a first reel 15A, that holds wound filament, fiber, or a tow of ceramic. In some examples, the wound filament, fiber, or tow of ceramic may be pre-coated with an interface coating, pre-impregnated with a curable resin, pre-coated and pre-impregnated, or may be bare (e.g., may include no coatings). In some examples, tow deposition device 14A may advance the filament, fiber, or tow from first reel 15A. At least one of tow deposition device 14A or first reel 15A may include a motor to advance the fiber, filament, or tow. While various examples are described with reference to depositing a tow, similar examples may be performed using individual filaments or fibers instead of tows.

Figure 1B:
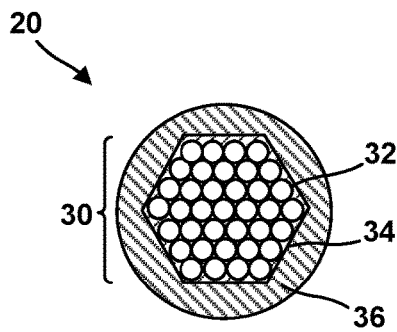
FIG. 1B is a conceptual diagram illustrating a cross-section of an example impregnated tow deposited by the system of FIG. 1A.

FIG. 1B is a conceptual diagram illustrating a cross-section of an example impregnated tow 20 deposited by the system of FIG. 1A. Impregnated tow 20 includes a tow core 30. Tow core 30 may include at least one filament or fiber 32 comprising at least one ceramic. In some examples, tow core 30 includes a plurality of filaments or fibers 32, as shown in FIG. 1B. In some examples, fibers in tow core 30 may be symmetrically close packed, as shown in FIG. 1B, so that tow core 30 is substantially symmetric about an axis along tow core 30. In other examples, tow core 30 may be asymmetric, for example, flattened, elliptical, or tape-like.

Tow core 30 may include any filaments or fibers 32 including an inorganic material stable at predetermined operating and processing temperatures, for example, temperatures above about 1000° C. Suitable examples include, but are not limited to, aluminum oxide ($Al_2O_3$), mullite ($Al_6Si_2O_{13}$), zirconium oxide ($ZrO_2$), carbon (C), graphite, silicon carbide (SiC), silicon carbon nitride, silicon nitride, boron nitride, and mixtures and combinations thereof. Suitable commercially available inorganic fibers include, for example, preceramic SiC fibers such as those available under the trade designation HI-NICALON and SYLRAMIC from COI Ceramics, Inc., San Diego, Calif.

Tow core 30 or individual filaments or fibers 32 may be coated with an interface coating 34. Interface coating 34 may function a compliant layer at an interface between the filaments or fibers 32 and/or tow core 30 and a matrix to enhance toughness and crack deflection in the final composite article and/or to prevent reaction of the filaments or fibers 32 with subsequently introduced components. Suitable coatings include, but are not limited to, carbon, aluminum nitride, boron nitride, silicon nitride, silicon carbide, boron carbide, metal borides, transition metal silicides, transition metal oxides, transition metal silicates, rare earth metal silicates and mixtures and combinations thereof. In some examples, interface coating 34 may not extend into an interior of tow core 30, and may be present substantially at a major surface of tow core 30. In other examples, interface coating 34 may at least partially extend into an interior of tow core 30, e.g., may coat individual filaments or fibers 32.

In some examples, system 10 optionally includes components for storing and treating tow core 30 to ultimately form impregnated tow 20. For example, system 10 may include a core reel 27 on which tow core 30 may be wound. Tow deposition device 14A or another component of system 10 may cause tow core 30 to be drawn or advanced from core reel 27 for further processing.

In some examples, system 10 includes an interface coater 28 to provide interface coating 34 on tow core 30. In some examples, interface coater 28 includes a furnace, for example, for depositing interface coating 34 by vapor deposition on tow core 30 in the furnace. Any suitable interface coating composition may be used to form interface coating 34 in interface coater 28. Tow deposition device 14A or another component of system 10 may cause tow core 30 to be drawn or advanced from core reel 27 into interface coater 28, where it may be treated to form an interface coated tow.

Tow core 30 may be impregnated with curable resin 36, instead of or in addition to being coated with interface coating 34. For example, curable resin 36 may substantially impregnate an interior of tow core 30. In some examples, curable resin 36 also surrounds tow core 30 as a coating, as shown in FIG. 1B. Curable resin 36 may include a polymeric material, such as a thermoplastic. Example thermoplastics include polyvinyl alcohol, polyolefins, polystyrene, acrylonitrile butadiene styrene, polylactic acid, thermoplastic polyurethanes, aliphatic polyamides, or the like, or combinations thereof. Curable resin 36 may include a precursor, for example, one or more monomers, oligomers, or non-crosslinked polymers suitable for forming a polymeric material upon curing.

In some examples, the curable resin 36 may include a flowable carrier. The flowable carrier may impart flowability to the composition, such that the composition may be extruded or drawn from tow deposition device 14A as tows 20A. The flowable carrier may be removed from tows 20A, for example, by drying, evaporation, or the like, to cause tows 20A to solidify. The flowable carrier may include an organic or inorganic solvent or mixture of solvents. In some examples, instead of, or in addition to, one or more solvents, the flowable carrier may include one or more of a gel, a resin, a monomer, an oligomer, a polymer, or a lubricant. In some examples, one or more of the resin, monomer, oligomer, or polymer may be substantially the same as the curable resin 36. In other examples, one or more of the resin, monomer, oligomer, or polymer may be different from curable resin 36.

In some examples, curable resin 36 may be a high-char yield resin, a preceramic polymer resin, or mixtures thereof. The high char-yielding component may include a material, such as a monomer, an oligomer, a polymer, or the like, that, when pyrolyzed, yields a high percentage of carbon. In some examples, the high char-yielding component includes furfuryl alcohol, a short-chain polymer derived by polymerizing furfuryl alcohol, or a phenolic material, such as a phenolic resin carried by an organic solvent.

The preceramic polymer resin may include inorganic or hybrid organic-inorganic polymers that may be thermally treated to form ceramic material. In some examples, the preceramic polymer resin includes polymers with one or more of silicon, boron, or aluminum in the polymeric backbone. For example, polymers such as polysiloxanes, polysilazanes, and polycarbosilanes, polyborosilane, polyborosilazane, borazine, or combinations thereof may be used.

In some examples, curable resin 36 additionally includes metal, alloy, or ceramic particles. For example, curable resin 36 may include particles of aluminum nitride, aluminum diboride, boron carbide, aluminum oxide, mullite, zirconium oxide, carbon, silicon carbide, silicon nitride, transition metal nitrides, transition metal borides, rare earth oxides, and mixtures and combinations thereof. The size of the particles may vary widely, and typically have a major dimension of less than about 50 μm. In various embodiments, the particles may have a wide variety of regular or irregular shapes including, for example, spheres, rods, disks, and the like. In various embodiments, the major dimensions of the particles may form a monomodal, a bimodal, or a multimodal distribution. In some examples, curable resin 36 may include or be in the form of a slurry, or a slurry may include curable resin 36. In some such examples, tows may be impregnated with the slurry.

In some examples, system 10 includes a slurry bath 29 to provide curable resin 36 on tow core 30. For example, slurry bath 29 may hold a volume of slurry or another composition including curable resin 36, and tow deposition device 14A or another component of system 10 may cause tow core 30 to be drawn or advanced from core reel 27 into and through slurry bath 29, where tow core 30 may be impregnated with curable resin 36 to form impregnated tow 20. Tow core 30 may be impregnated by any suitable techniques, such as spraying, coating, drawing, dripping, and the like or combinations thereof, in slurry bath 29.

In some examples, curable resin 36 may include a polymerization initiator, for example, a thermal initiator or photoinitiator to promote thermal curing or photocuring. Curable resin 36 may optionally include other additives such as dispersants, binders, surfactants, pH adjustors, and the like. Curable resin 36 may be tacky, sticky, or otherwise cause an impregnated tow of plurality of impregnated tows 20 to adhere to adjacent tows in the same layer or in adjacent layers. The impregnated tow 20 may be advanced and wound onto a reel, for example, first reel 15A.

Thus in some examples, first reel 15A may hold tow that is coated with interface coating 32 and impregnated with curable resin 36. The tow may be continuously advanced from first reel 15A and extruded by tow deposition device 14A, for example, as impregnated tows 20A. In some examples, first reel 15A may hold tow coated with interface coating 32, and dispense such coated through slurry bath 29 to tow deposition device 14A, such that the tows are continuously coated with slurry or curable resin 36 during the extrusion. In some examples, an uncoated tow core 30 may be intermittently or continuously advanced from core reel 27, continuously coated in interface coater 28, impregnated in slurry bath 29, and then extruded from tow deposition device 14A. In some examples, a pre-coated tow core coated with interface coating 34 may be intermittently or continuously advanced from first reel 15A, impregnated in slurry bath 29, and then extruded from tow deposition device 14A. Thus, system 10 may continuously or intermittently perform at least one of coating or impregnation of tow cores before extruding impregnated tows through tow deposition device 14A.

Ultimately, tow deposition device 14A may extrude respective impregnated tows 20 of a plurality of respective impregnated tows to form a layer of material, for example, a first layer 22A, on a major surface 24 of a substrate 25 (or, in subsequent layers, on a previously deposited layer). For example, tow deposition device 14A may extrude at least a first impregnated tow 20A of the plurality of impregnated tows. Impregnated tow 20A may be substantially similar to tow 20 described with reference to FIG. 1B.

Substrate 25 may include a build plate on stage 18, or any suitable substrate defining a build surface. In some examples, system 10 may not include a separate substrate 25, and tow 20A may be deposited on a build surface defined by stage 18, or on another component, or on prior layers of preimpregnated tows or another material.

Thus, impregnated tows may be extruded, drawn, or deposited from tow deposition device 14A, for example, from a nozzle or a die of tow deposition device 14A, to form one or more layers including respective impregnated tows of plurality of impregnated tows 20A on or adjacent stage 18 or substrate 25. Plurality of impregnated tow 20A, or ultimately, layer 22A, may be dried, cured, or otherwise solidified to ultimately form a portion of an additively manufactured composite component.

In some examples, system 10 includes an energy source 26 configured to deliver energy to one or more tows of plurality of impregnated tows 20A to cure tow 20A, for example, by photocuring or thermally curing the composition of tow 20A. For example, curable resin 36 may be cured as tow 20A is extruded and/or after being laid down in layer 22A. Energy source 26 may include a thermal energy source, microwave energy source, electrical energy source, ultrasound energy source, photoenergy source, chemical source or any source suitable or configured to initiate or cause curing of curable resin 36. Ultimately, energy source 26 may be used to cure the curable resin in at least one of the impregnated tows or layers to form the CMC component.

In some examples, additive manufacturing system 10 includes enclosure 16, which at least partially encloses tow deposition device 14A, stage 18, and substrate 25. Enclosure 16 may provide physical protection to tow deposition device 14A, stage 18, and substrate 25 during operation of additive manufacturing system 10, may maintain an atmosphere within enclosure 16 in a desired state (e.g., filled with an inert gas, under vacuum, or maintained at a desired temperature), or the like. In some examples, enclosure 16 may define a furnace or another thermal chamber or environment in which any predetermined temperature sufficient to process or treat tows or an article deposited by system 10. In some examples, enclosure 16 may include thermally insulative walls, and energy source 26 within enclosure 16 may provide a source of heat to cause an interior of enclosure 16 to be heated. In some examples, one or more heating elements or coils may be disposed in or on walls of enclosure 16 to cause an interior of enclosure 16 to be heated. In some such examples, system 10 may not include a separate energy source 26.

In some examples, stage 18 is movable relative to tow deposition device 14A and/or tow deposition device 14A is movable relative to stage 18. For example, stage 18 may be translatable and/or rotatable along at least one axis to position substrate 25 relative to tow deposition device 14A. Similarly, tow deposition device 14A may be translatable and/or rotatable along at least one axis to position tow deposition device 14A relative to substrate 25. Stage 18 may be configured to selectively position and restrain substrate 25 in place relative to stage 18 during manufacturing of the additively manufactured component.

Computing device 12 may control movement and positioning of tow deposition device 14A relative to stage 18, and vice versa, to control the locations at which tows 20A are deposited and layer 22A is formed. Computing device 12 may control movement of tow deposition device 14A, stage 18, or both, based on a computer aided manufacturing or computer aided design (CAM/CAD) file, or an additive manufacturing model. For example, computing device 12 may control tow deposition device 14A to trace a pattern or shape to form layer 22A. Computing device 12 may control tow deposition device 14A or stage 18 to move substrate 25 away from tow deposition device 14A, then control tow deposition device 14A to trace a second pattern or shape to form a second layer including a plurality of impregnated tows on the first layer. Computing device 12 may control stage 18 and tow deposition device 14A in this manner to result in a plurality of layers, each layer including a traced shape or design.

In some examples, system 10 may include more than one deposition device. For example, system 10 may include first tow deposition device 14A and a second tow deposition device 14B. Second tow deposition device 14B may be substantially similar in structure and function to first tow deposition device. For example, computing device 12 may control first tow deposition device 14A to extrude impregnated tows 20A of the first plurality of tows to form first layer 22A, and may control second tow deposition device 14B to extrude at least a second impregnated tow 20B of a second plurality of tows to form second layer 22B. In some examples, system 10 may include additional reels, for example, second reel 15B, to hold tow to be dispensed to and extruded by second tow deposition device 14B or by additional tow deposition devices. Similarly, system 10 may include three or more tow deposition devices.

In some examples, each respective tow deposition device may extrude or deposit tows having substantially the same tow characteristics (for example, fiber composition, tow diameter, coating composition, or resin composition). For example, each impregnated tow of first plurality of tows 20A or of first layer 22A may have substantially the same transverse thickness as each impregnated tow of the second plurality of tows 20B or of second layer 22B. In other such examples, each respective tow deposition device may deposit tows having different tow characteristics, for example, different in at least one of fiber composition, tow diameter, coating composition, or resin composition. For example, at least one impregnated tow of the first plurality of tows 20A may have a transverse thickness different from at least one impregnated tow of the second plurality of tows 20B. In some examples, the respective impregnated tows of first layer of material 22A have a transverse thickness different from the respective impregnated tows of the second layer 22B of material.

In some examples, tow characteristics within a single layer may also be different. For example, alternating or adjacent tows may exhibit differences in tow characteristics, or series of tows in a single layer may exhibit a predetermined pattern of tow characteristics. In other examples, each tow in a single layer of tows has substantially the same tow characteristics.

In some examples, computing device 12 may control stage 18 and one or both of tow deposition devices 14A or 14B to extrude impregnated tows in alternating adjacent layers aligned along different directions. For example, alternating layers may include tows aligned at 30°, 45°, 60°, 90°, or any other suitable angle relative to each other. Together, the plurality of layers defines an additively manufactured composite component.

In some examples, the additively manufactured composite component may define one or more channels or voids, for example, having any suitable cross-sectional shape, including rectangular, triangular, trapezoidal, curvilinear, or the like, or may include channels, pillars, plateaus, or other features. Example systems and techniques according to the disclosure may be used to form additively manufactured CMC components from which residual material is substantially absent, for example, completely absent from such channels voids, or the like. For example, system 10 may deposit series of tows or layers with predetermined spacing or interruptions between tows or layers, to define voids or channels between tows or between layers. For example, a void or channel may be defined by a region in which tows are absent, and may be surrounded by tows of the same or of different layers including layer 22A or 22B. Thus, residual material may be absent or substantially absent from voids or channels in the additively manufactured composite component.

After one or more layers of the additively manufactured component have been formed, or after the complete component is formed by additive manufacturing, the component may be subjected to further treatment, for example, curing. For example, curing may be performed during or after depositing individual tows 20A or 20B, during or after depositing layers including tows 20A or 20B, or during or after depositing the entire component. In some examples, partial curing may be performed while depositing tows 20A or 20B, or layers including tows 20A or 20B, and curing may be completed by continued or extending exposure to energy from energy source 26 after the component is completely fabricated. In some examples, curing may be completed after depositing each respective tow 20A or 20B, or after depositing each respective layer.

In some examples, computing device 12 may control, based on a model of the component, one or more tow deposition devices 14A or 14B to deposit a plurality of individual and distinct layers, for example, by extruding impregnated tows forming respective layers. Each layer of the plurality of layers may correspond to a layer or slice of the model, and may have different contours or thicknesses. After the layers are formed, the layers may be laid-up to form a laid-up component. The laid-up component may be cured to form the component. In some examples, curable resin in tows or layers used to form the laid-up component may be uncured or partially cured, and resin in laid-up component may subsequently be fully cured.

In some examples, the cured component is further processed to form a ceramic matrix component. For example, the cured component may be processed by melt infiltration. For example, a molten metal or alloy infiltrant is applied to the cured composite component. The molten metal or alloy wicks into the cured composite component, for example, between particles or fibers, and occupies the interstices between the particles or the fibers, until the cured composite component is fully densified to less than about 10%, or less than about 5%, or less than about 3%, or less than about 1%, porosity to form a composite article. In some examples, the alloy infiltrant includes at least one of Si, B, Al, Y, Ti, Zr, oxides or compounds thereof, and mixtures and combinations thereof. In various embodiments, the temperature for metal alloy infiltration such as for example, using molten Si, is about 1400° C. to about 1500° C. The infiltration process can optionally be carried out under vacuum, or in inert gas under atmospheric pressure. The densified component may be a ceramic matrix composite component.

Figure 2:
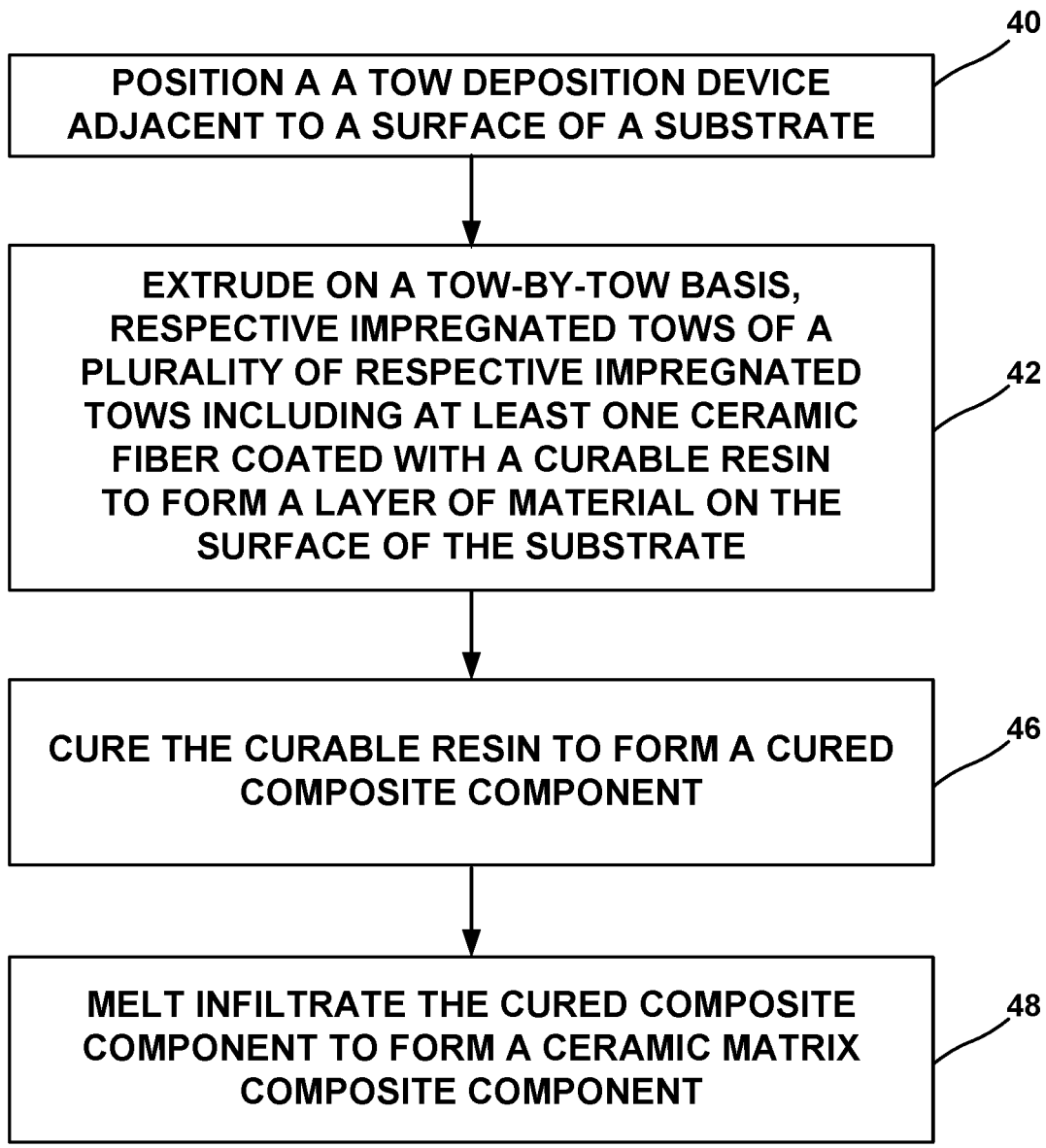
FIG. 2 is a flow diagram illustrating an example technique for forming an additively manufactured composite component.

An example technique that may be implemented by system 10 will be described with concurrent reference to FIG. 2. FIG. 2 is a flow diagram illustrating an example technique for forming an additively manufactured composite component. Although the technique of FIG. 2 is described with respect to system 10 of FIG. 1, in other examples, the technique of FIG. 2 may be performed by other systems, such as systems including fewer or more components than those illustrated in FIG. 1. Similarly, system 10 may be used to performed other additive manufacturing techniques.

The technique of FIG. 2 may include positioning tow deposition device 14A adjacent to substrate 25 including surface 24, e.g., on stage 18 (40). In some examples, system 10 may not include a separate substrate 25, the technique of FIG. 2 may include positioning of tow deposition device 14A relative to a build surface defined by stage 18, or by another component, or prior layers of prior tows 20A or another material.

The technique of FIG. 2 includes extruding, on a tow-by-tow basis, respective impregnated tows 20A of a plurality of respective impregnated tows to form layer 22A of material on major surface 24 of substrate 25 (42). Each respective impregnated tow 20A includes at least one ceramic fiber and curable resin 36 coating the at least one ceramic fiber. In some examples, the at least one ceramic fiber is part of a tow, for example, tow core 30. Tow core 30 may be coated with interface coating 32. In some examples, extruding impregnated tows 20A (42) may include coating a first tow core (for example, tow core 30) of a plurality of tow cores with an interface coating. Tow core 30 is coated with or impregnated with curable resin 36. In some examples, extruding respective impregnated tows 20A (42) may include impregnating or coating the first tow core with curable resin 36.

A plurality of tows 20A defining a common plane may define a layer of material. In some examples, computing device 12 may cause tow deposition device 14A to extrude impregnated tows 20A in one or more layers 22A to ultimately form the additively manufactured component. Thus, successive tows may defines a series of layers, for example, parallel layers, and the series of layers may eventually define the additively manufactured component.

The technique of FIG. 2 may include forming, on layer 22A of material, at least one additional layer, for example, second layer 22B of material. Forming second layer 22B may include extruding impregnated tows 20B.

Tow deposition device 14A may be used to form both first layer 22A and second layer 22B or subsequent layers. For example, computing device 12 may control movement of tow deposition device 14A (or energy source 26), stage 18, or both, based on a model (for example, a computer aided manufacturing or computer aided design (CAM/CAD) file or additive manufacturing model) to deposit second layer 22B or subsequent layers. In other examples, more than one tow deposition devices may be used. For example, computing device 12 may control movement of second tow deposition device 14B (or energy source 26), stage 18, or both, based on the model to deposit second layer 22B or subsequent layers.

Impregnated tows 20A in first layer 22A and impregnated tows 20B in second layer 22B may be aligned along different directions. For example, impregnated tows 20A in first layer 22A may be aligned along a first direction, and impregnated tows 20B in second layer 22B may be aligned along a second direction different from the first direction. The second direction may form any predetermined minor angle relative to the first direction, for example, any angle 90° or less than 90°, for example, 30°, 45°, 60°, or 75° or another suitable angle. The angles between directions of tows in alternating respective tows may be different, or be substantially the same. In some examples, the second direction is perpendicular to the first direction along a plane between first layer 22A and second layer 22B. For example, computing device 12 may control, based on the model, one or both of first and second tow deposition devices 20A and 20B to cause layers 22A and 22B to be formed with tows 20A and 20B aligned along different directions.

In some examples, computing device 12 may control movement and positioning of tow deposition device 14A relative to stage 18, and vice versa, to control the locations at which tows 20A are formed. Computing device 12 may control movement of tow deposition device 14A or 14B, stage 18, or both, based on a model of the component, for example, a computer aided manufacturing or computer aided design (CAM/CAD) file, or an additive manufacturing model. For example, computing device 12 may control tow deposition device 14A to trace a pattern or shape to form a layer including a plurality of layers on surface 24. Computing device 12 may control tow deposition device 14A or 14B, or stage 18 to move substrate 25 away from tow deposition device 14A or 14B, then control tow deposition device 14A or 14B to trace a second pattern or shape to form a second layer including a plurality of tows on the previously deposited layer. Computing device 12 may control stage 18 and one or both of tow deposition devices 14A or 14B (or additional tow deposition devices) in this manner to result in the plurality of layers, each layer including a traced shape or design. Together, the plurality of layers defines an additively manufactured component.

The technique includes curing curable resin 36 to form the CMC component (46). For example, computing device 12 may control energy source 26 to cause partial or complete curing of curable resin during or after depositing at least one of individual tows 20A, 20B, or other tows; or at least one of layers 22A, 22B or other layers. In some examples, after all the layers are deposited, the component may include partially cured resin, and computing device 12 may control energy source 26 to cause the partially cured resin in the as-deposited component to fully cure, to form the cured composite component (46).

In some examples, the technique of FIG. 2 optionally includes melt infiltrating the cured composite component to form a ceramic matrix composite (CMC) (48). For example, a molten metal or alloy composition may be infiltrated into the cured composite component to densify the cured composite component and form the CMC component.

Thus, the technique of FIG. 2 may be used to additively form a cured composite component, a CMC-precursor, or a CMC component. Another example technique for forming a cured composite component is described with reference to FIG. 3.

Figure 3:
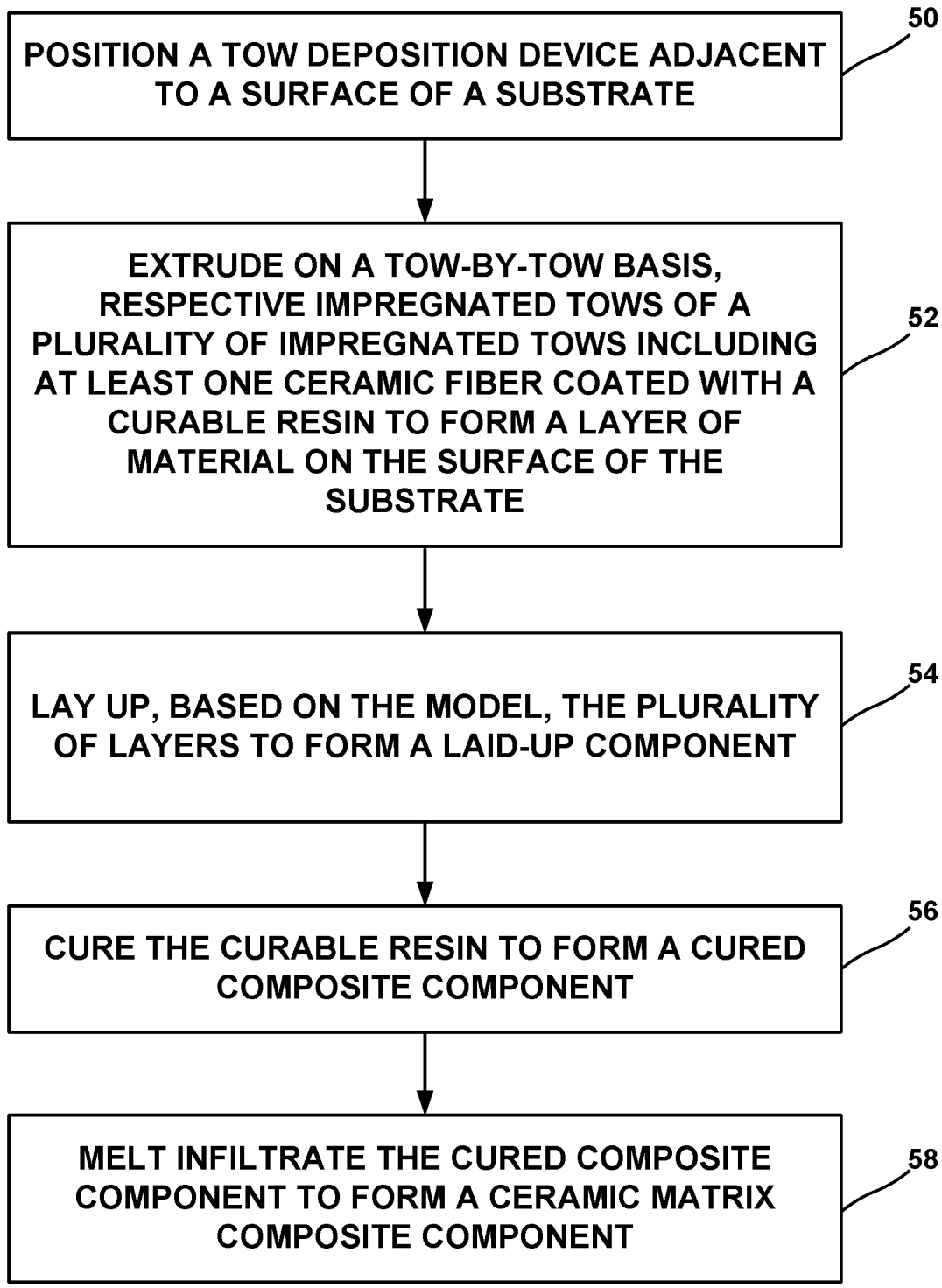
FIG. 3 is a flow diagram illustrating an example technique for forming a composite component by laying up additively manufactured layers.

FIG. 3 is a flow diagram illustrating an example technique for forming a cured composite composite component by laying up additively manufactured layers. Although the technique of FIG. 3 is described with respect to system 10 of FIG. 1, in other examples, the technique of FIG. 3 may be performed by other systems, such as systems including fewer or more components than those illustrated in FIG. 1. Similarly, system 10 may be used to performed other additive manufacturing techniques.

The technique of FIG. 3 may include positioning tow deposition devices 14A or 14B adjacent to substrate 25 including surface 24, e.g., on stage 18 (50). In the technique of FIG. 3, different layers may be individually formed on substrate 25, and as such, after forming each respective layer, surface 24 may be cleared by removing the immediately formed layer, and cleaning or preparing as necessary for depositing a subsequent layer. Thus, the positioning may be repeated for each layer, or for combinations of layers.

The technique includes extruding, by tow deposition device 14A, on a tow-by-tow basis, respective impregnated tows 20A of a plurality of respective impregnated tows to form layer 22A of material on major surface 24 of substrate 25 (52). Each respective impregnated tow 20A includes at least one ceramic fiber and curable resin 36 coating the at least one ceramic fiber The technique includes laying up a plurality of layers of material to form a laid-up component (54). Each layer of the plurality of layers includes a respective plurality of impregnated tows (20A, 20B, and the like) comprising at least one ceramic fiber and curable resin 36. For example, computing device 12 may control at least one of tow deposition devices 14A or 14B, or other tow deposition devices, to extrude impregnated tows (20A, 20B) of a plurality of impregnated tows to form individual layers. Successive layers may each be individually formed on surface 24 of substrate 25, instead of being formed on each other, and may be removed from substrate 25 after being formed.

For example, the individual layers formed by the depositing (52) may be collated, stacked, and aligned based on the model. In some examples, computing device 12 may control, based on the model, an industrial robot, a multi-axis stage, a pick-and-place mechanism, or the like, to orient and assemble layers on surface 24 to lay up the layers.

The technique includes curing the curable resin to form a cured composite component (56). In some examples, no curing may be performed before the lay up (54), and complete curing may be performed directly on the laid-up component. In other examples, at least partial curing of tows or layers may be performed during depositing individual layers (52) before the lay-up (54), and curing (56) may be completed after the lay-up (54). Similar to the technique of FIG. 2, computing device may control energy source 26 to perform the curing (56).

In some examples, the technique of FIG. 3 optionally includes melt infiltrating the cured composite component to form a ceramic matrix composite (CMC) (58). For example, a molten metal or alloy composition may be infiltrated into the cured composite component to densify the cured composite component and form the CMC component.

Thus, systems and techniques according to the disclosure may be used to form cured composite components, CMC-precursors, or CMC components by additive manufacturing.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   continuously coating a tow with an interface coating using a vapor phase process to form an interface coated tow, wherein the tow comprises at least one ceramic fiber;
   continuously coating the interface coating of the interface coated tow with a curable resin to form an impregnated tow, wherein the curable resin is chosen from a thermoplastic polymeric material, a precursor curable to form a thermoplastic polymeric material, wherein the thermoplastic polymeric material is chosen from polyvinyl alcohol, polyolefins, polystyrene, acrylonitrile butadiene styrene, polylactic acid, thermoplastic polyurethane, aliphatic polyamides, and combinations thereof, or a high-char yield resin, wherein the high-char yield resin is chosen from furfuryl alcohol, a polymer derived from polymerizing furfuryl alcohol, or a phenolic material;
   extruding, by a tow deposition device, on a tow-by-tow basis, respective impregnated tows of a plurality of respective impregnated tows to form a first layer of material on a major surface of a substrate;
   curing the curable resin to form a cured composite component; and
   melt infiltrating the cured composite component to form a ceramic matrix composite (CMC).

2. The method of claim 1, further comprising, prior to extruding the respective impregnated tows continuously advancing the impregnated tow into the tow deposition device, wherein extruding respective impregnated tows comprises positioning the impregnated tow at a desired location in the first layer of material and cutting the impregnated tow to define a respective impregnated tow of the plurality of impregnated tows.

3. The method of claim 1, wherein curing the curable resin comprises thermally curing or photocuring the curable resin.

4. The method of claim 1, wherein the respective impregnated tows are aligned along a first direction, further comprising:
    extruding, by the tow deposition device, on a tow-by-tow basis, respective impregnated tows of the plurality of respective impregnated tows to form a second layer of material on a major surface of the first layer of material, wherein the respective impregnated tows in the second layer of material are aligned along a second direction different from the first direction.

5. The method of claim 4, wherein the second direction is perpendicular to the first direction along a plane between the first layer and the second layer.

6. The method of claim 4, wherein each respective impregnated tow of the first layer of material has substantially the same transverse thickness as each respective impregnated tow of the second layer of material.

7. The method of claim 4, wherein the respective impregnated tows of the first layer of material have a transverse thickness different from the respective impregnated tows of the second layer of material.

8. The method of claim 1, wherein extruding the respective impregnated tows comprises controlling, by a computing device, based on a model of the cured composite component, the tow deposition device to extrude the respective impregnated tows of the plurality of impregnated tows.

9. The method of claim 8, wherein the tow deposition device is a first tow deposition device configured to extrude respective impregnated tows in a first layer, the method further comprising controlling, by the computing device, based on the model, a second tow deposition device to extrude respective impregnated tows in a second layer on the first layer.

10. The method of claim 1, wherein the interface coating defines a compliant layer between the at least one ceramic fiber and the curable resin.

11. The method of claim 1, wherein the interface coating comprises at least one of carbon, aluminum nitride, boron nitride, silicon nitride, silicon carbide, boron carbide, a metal boride, a transition metal silicide, a transition metal oxide, a transition metal silicate, or a rare earth metal silicate.

12. The method of claim 1, wherein the interface coating at least partially extends into an interior of the tow.

13. A method comprising:
    continuously coating a tow with an interface coating using a vapor phase process to form an interface coated tow, wherein the tow comprises at least one ceramic fiber;
    continuously coating the interface coating of the interface coated tow with a curable resin to form an impregnated tow, wherein the curable resin is chosen from a thermoplastic polymeric material, a precursor curable to form a thermoplastic polymeric material, wherein the thermoplastic polymeric material is chosen from polyvinyl alcohol, polyolefins, polystyrene, acrylonitrile butadiene styrene, polylactic acid, thermoplastic polyurethane, aliphatic polyamides, and combinations thereof, or a high-char yield resin, wherein the high-char yield resin is chosen from furfuryl alcohol, a polymer derived from polymerizing furfuryl alcohol, or a phenolic material;
    extruding, by a tow deposition device, on a tow-by-tow basis, respective impregnated tows of a plurality of respective impregnated tows to form a plurality of layers of material;
    laying up the plurality of layers of the material on a major surface of a substrate to form a laid-up component;
    curing the curable resin to form a cured composite component; and
    melt infiltrating the cured composite component to form a ceramic matrix composite (CMC).

14. The method of claim 13, wherein curing the curable resin comprises thermally curing the curable resin or photocuring the curable resin.

15. The method of claim 13, wherein the extruding comprises controlling, by a computing device, based on a model of the cured composite component, at least one tow deposition device to extrude the respective impregnated tows of the plurality of impregnated tows.

* * * * *